United States Patent Office 3,415,693
Patented Dec. 10, 1968

3,415,693
PROCESS FOR SEPARATING WORKPIECES
Karl Gollwitz, Sprendlingen-Hirschsprung, and Horst K. Lotz, Frankfurt am Main, Germany, assignors to Messer Griesheim G.m.b.H., Frankfurt am Main, Germany, a corporation of Germany
No Drawing. Filed Mar. 16, 1966, Ser. No. 534,628
5 Claims. (Cl. 148—9)

ABSTRACT OF THE DISCLOSURE

A process for cutting a metal workpiece partially cutting the workpiece by a plasma ray, preferably inclined at a 20–30 angle with the workpiece, to a predetermined depth and then cutting the remaining thickness by an acetylene cutting torch flame.

---

This invention relates to a process for the separation of metal workpieces, particularly workpieces made of steel or steel alloys.

For the separation of metal workpieces, particularly of steel or steel alloys, mechanical separation processes, such as sawing, planing, shearing, cutting, breaking and grinding have been used, as well as processes employing gas techniques, e.g. acetylene torch cutting with or without powder addition, cutting with the electric arc and plasma ray.

In all these processes the separation speed depends on the thickness of the material, the type of material, the temperature of the material during cutting, and the special requirements of the individual separation process. Some separation processes are therefore basically useless for certain types of material and thicknesses of material.

The efforts of the industry are always directed toward having separation processes available which can separate even steel with alloy parts of chromium, nickel, molybdenum, etc., in a relatively short time even with respect to great thicknesses of material. In this connection, the gas-techniques processes offer advantages over the mechanical separation processes, particularly because of the higher cutting speed of the gas processes.

For example, the cutting speed with acetylene torch cutting of normal carbon steel of 250 mm. thickness at 20° C. material thickness amounts to 180 mm. per minute. In acetylene torch cutting of high-alloy steel (V2A) of 250 mm. thickness and a temperature of the material of 20° C., the cutting speed amounts to 80 mm. per minute whereby an auxiliary powder is used. When cutting steel and steel alloys with the plasma ray, the cutting speed amounts to about 200 mm. per minute at material thickness of about 100 mm. Above 150 mm. workpiece thickness, the cutting speed decreases rapidly. The type of material and the temperature of the material is of secondary importance in this connection.

An object of this invention is to provide a process with which considerably higher cutting speeds with equal requirements can be achieved.

According to the invention, it is proposed first to cut into the workpiece with a plasma ray to a certain part of its thickness and then an acetylene cutting torch flame (if necessary with a powder addition) is directed to this separating line to completely cut through the workpiece. The acetylene cutting torch here preferably follows the plasmic torch at a slight distance, since the heat produced by the plasmic ray and the melt can thereby be utilized.

Preferably, the plasmic torch is arranged at about a 20–30° angle in order to achieve an easier flowing off of the liquid metal.

For the assistance of slag drainage a compressed air stream, preferably at a certain angle, can also be blown into the cutting nozzle.

For the sake of expediency, the acetylene and the plasmic torches are combined in one torch, in order to keep the distance between the plasmic ray and the acetylene flame as small as possible.

EXAMPLE

Experiments were made with the following devices and values:

1. Plasmic torch cutting apparatus

| | |
|---|---|
| Available capacity | 200 kw. |
| Adjusted capacity | 183 kw. |
| Adjusted voltage | 235 volts. |
| Adjusted current | 780 A. |
| Machine torch | Type TAC 200″ with plasmic nozzle L 180. |
| Gas for plasma production | Nitrogen and hydrogen in the ratio of 4:1, total 10 N m.$^3$/h. |

2. Acetylene torch cutting apparatus

HEAVY-DUTY CUTTING TORCH "DStW 500" WITH CUTTING NOZZLE

[DSTPLM Gr. 1 for propane]

Pressures:
  Cutting oxygen _____atm. press__ 5.0
  Heating oxygen _____do____ 4.5
  Propane _____do____ 0.5
  Compressed air feed pressure for powder __do____ 2.5
  Compressed air container pressure _____do____ 0.5
Powder expenditure _____kg./h__ 11

Gas consumptions can be taken from the torch table.

The experimental distance between the gas jets between the plasma and the acetylene torches amounted to 80 mm., the distances between the nozzles and the workpiece for both nozzles 15 mm. In each instance the cutting began with a running start.

RESULTS OF EXPERIMENT

| | C-steel 250 mm. thick, 20° C. | Chromium-nickel-steel 210 mm. thick, 20° C. |
|---|---|---|
| (1) Cutting speed (mm./min.) | 250 | 300 |
| (2) Cutting joint width (mm.) | ca. 15 | ca. 15 |

The example shows that the invention enables a considerable increase of cutting speed, especially with respect to alloyed steels. Above all, because of the invention, the advantages of the plasmic cutting can also be utilized with thick workpieces. The heating of the material in the gap by the plasmic ray to above melting temperature allows the utilization of the inflammability and of the melt flow for acetylene torch cutting.

Obviously many modifications and variations of the present inventions are possible in light of the above teachings. It is, therefore, to be understood that within the scope of the appended claims the invention may be practiced than as specifically described.

What is claimed is:
1. A process for cutting a metal workpiece comprising partially cutting said workpiece by a plasma ray to a predetermined portion of the workpiece thickness, and then cutting the remaining thickness by an acetylene cutting torch flame.

2. A process as set forth in claim 1 wherein the acetylene torch cutting is done relatively shortly after the plasma cutting.

3. A process as set forth in claim 1 wherein the plasma torch for plasma ray cutting is at an angle of about 20–30° to the workpiece.

4. A process as set forth in claim 1 wherein said metal is a steel alloy.

5. A process as set forth in claim 1 wherein the acetylene cutting is done with the addition of powder.

References Cited

UNITED STATES PATENTS 3,246,115   4/1966   Johnson _____ 219—75

L. DEWAYNE RUTLEDGE, *Primary Examiner.*

W. W. STALLARD, *Assistant Examiner.*

U.S. Cl. X.R.

219—75